(12) United States Patent
Baillon et al.

(10) Patent No.: US 7,580,132 B2
(45) Date of Patent: Aug. 25, 2009

(54) OPTICAL DEVICE FOR MEASURING A DOPPLER FREQUENCY SHIFT

(75) Inventors: Bertrand Baillon, Pins Justaret (FR); Jean-Pierre Schlotterbeck, Rochefort-Samson (FR); Xavier Lacondemine, Valence (FR); Alain Renard, Chabeuil (FR)

(73) Assignee: Thales (FR)

( * ) Notice: Subject to any disclaimer, the term of this patent is extended or adjusted under 35 U.S.C. 154(b) by 167 days.

(21) Appl. No.: 11/579,504

(22) PCT Filed: Mar. 16, 2005

(86) PCT No.: PCT/EP2005/051217

§ 371 (c)(1),
(2), (4) Date: Nov. 3, 2006

(87) PCT Pub. No.: WO2005/114251

PCT Pub. Date: Dec. 1, 2005

(65) Prior Publication Data

US 2007/0223004 A1    Sep. 27, 2007

(30) Foreign Application Priority Data

May 4, 2004    (FR) .................................. 04 04759

(51) Int. Cl.
*G01B 9/02* (2006.01)
(52) U.S. Cl. ..................................... 356/484
(58) Field of Classification Search ................. 356/28.5, 356/484–487
See application file for complete search history.

(56) References Cited

U.S. PATENT DOCUMENTS

| | | | | | |
|---|---|---|---|---|---|
| 3,950,100 | A | * | 4/1976 | Keene et al. .................... | 356/28 |
| 4,190,362 | A | * | 2/1980 | Dubrunfaut ................. | 356/5.07 |
| 4,515,471 | A | * | 5/1985 | Eden ......................... | 356/5.09 |
| 4,886,362 | A | * | 12/1989 | Oono ......................... | 356/489 |
| 4,902,125 | A | * | 2/1990 | Keene et al. ................ | 356/5.09 |

(Continued)

FOREIGN PATENT DOCUMENTS

EP    1043632    10/2000

(Continued)

OTHER PUBLICATIONS

Toda et al, Optical Integrated Circuit for a Fiber Laser Doppler Velocimeter, Journal of Lightwave Technology, vol. LT-5, Jul. 1987, pp. 901-905.*

(Continued)

*Primary Examiner*—Samuel A Turner
(74) *Attorney, Agent, or Firm*—Lowe Hauptman Ham & Berner, LLP

(57) ABSTRACT

The invention relates to a device for measuring a Doppler frequency shift, including an optical signal channel delivering a signal light beam illuminating a reference medium; and a reference channel delivering a reference light beam for detecting the Doppler frequency shift. The frequency shift is determined from the difference in frequency between the light signal illuminating the reference medium and the light beam returned by the reference medium. The device includes at least two light radiation sources, preferably lasers, with one light radiating source generating the light beam for the signal channel and the other source generating the light beam for the reference channel.

16 Claims, 3 Drawing Sheets

U.S. PATENT DOCUMENTS

| | | | |
|---|---|---|---|
| 5,018,151 A | | 5/1991 | Seaton |
| 5,082,364 A | * | 1/1992 | Russell ....................... 356/5.15 |
| 5,110,207 A | * | 5/1992 | Harris ........................ 356/5.09 |
| 5,141,319 A | * | 8/1992 | Kajimura et al. ............ 356/486 |
| 2003/0075677 A1 | * | 4/2003 | Halmos ................. 250/227.23 |
| 2003/0151732 A1 | | 8/2003 | Rogers et al. |

FOREIGN PATENT DOCUMENTS

| | | |
|---|---|---|
| EP | 1308732 | 5/2003 |
| FR | 2818752 | 6/2002 |
| RU | 2082085 A * | 6/1996 |

OTHER PUBLICATIONS

Lin et al, Analysis and Design of Coherent Super-Heterodyne Laser Doppler Vibrometer System, IEEE-IMTC'94, May 1994, pp. 348-351.*

Schwiesow et al, The NCAR Airborn Infrared Lidar System: Status and Applications, Journal of Atmospheric and Oceanic Technology, vol. 13, Feb. 1996, pp. 4-15.*

Kurihara, Noboru et al. "New Optical Technique for the Generation of Quadrature Signals on Laser Doppler Velocimeter", Nippon Kikai Gakkai Ronbunshu, B; Nippon Kikai Gakkai Ronbunshu, B Hen/ Transactions of the Japan Society of Mechanical Engineers, Part B Sep. 2002, vol. 68, No. 673, Sep. 2002, pp. 2580-2585, XP002309460.

* cited by examiner

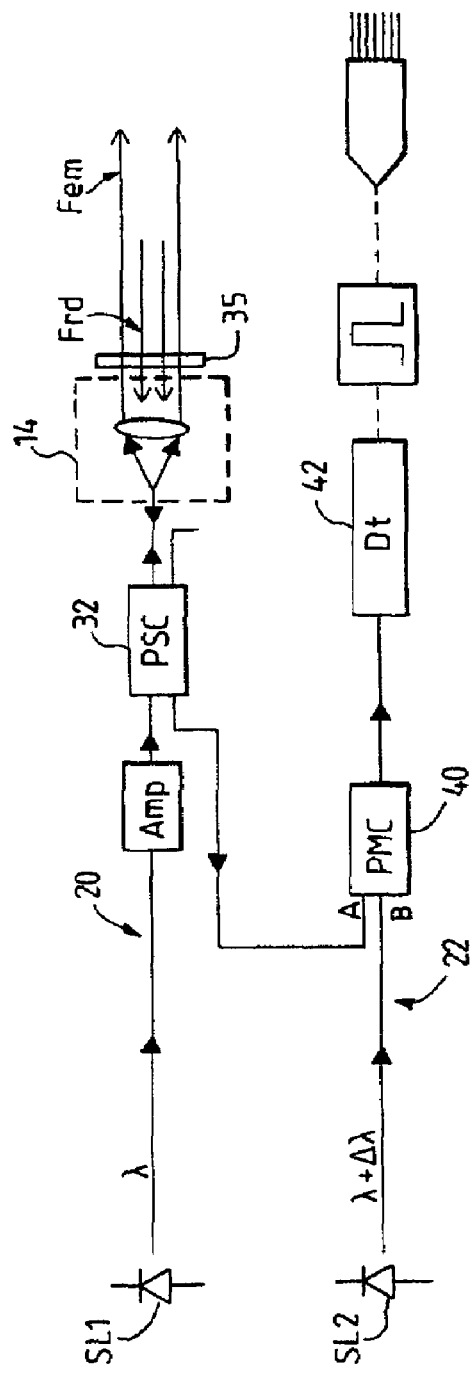
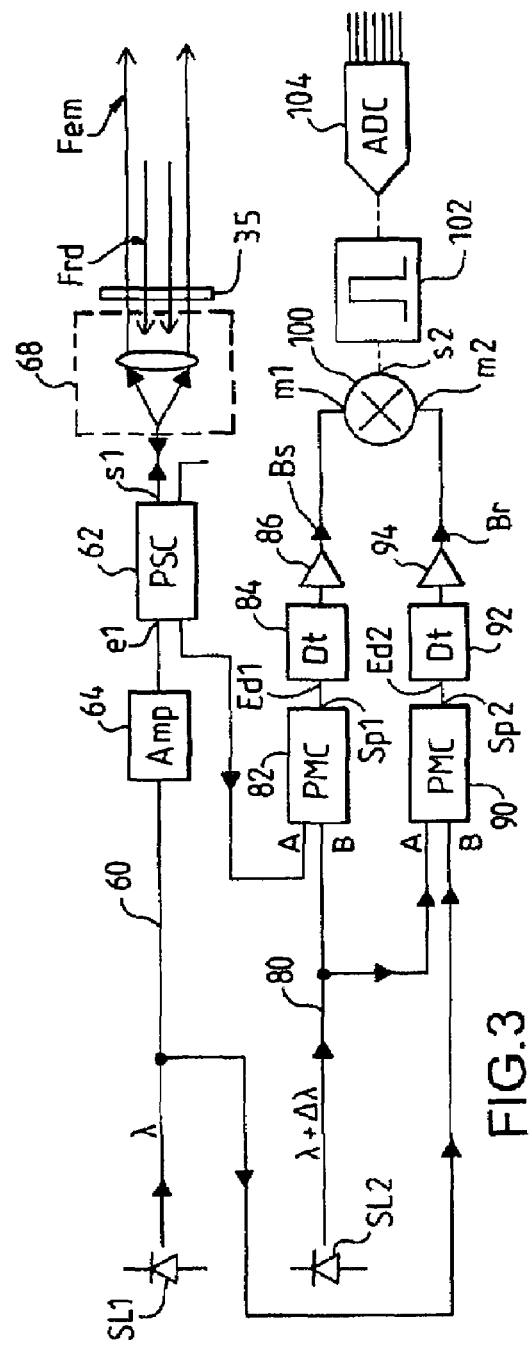

OPTICAL DEVICE FOR MEASURING A DOPPLER FREQUENCY SHIFT

RELATED APPLICATIONS

The present Application is based on International Application No. PCT/EP2005/0511217, filed on Mar. 16, 2005, which in turn corresponds to France Application No. 04/04759 filed on May 4, 2004, and priority is hereby claimed under 35 USC §119 based on these applications. Each of these applications are hereby incorporated by reference in their entirety into the present application.

FIELD OF THE INVENTION

The invention relates to a device for measuring Doppler shift of the optical type.

BACKGROUND OF THE INVENTION

In devices having a laser source and heterodyne coherent detection, it may be necessary to determine a frequency change (Doppler effect) occurring over part of the path of the laser beam and resulting from a physical phenomenon that it is desired to compensate for or to measure. This is in particular the case with lidars used for measuring wind speed and direction by the backscattering of the laser beam from aerosol particles carried by the wind. This frequency change is generally determined by mixing the signal received with a signal generated by a local oscillator affected by a frequency shift that is produced by an electrooptic modulator or an acoustooptic modulator (AOM).

A device of this kind is also used to measure the speed of aircraft relative to the surrounding medium. In this case, the device is called an anemometer.

The measurement distance defines the type of detection of the Doppler shift to be measured and the power of the light source of the anemometer. Thus, the detection may either be coherent detection or direct or incoherent detection.

In the case of heterodyne coherent detection, the beam coming from the light radiation source (a laser) is split into two, one part being spatially shaped and sent to the measurement zone. An acoustooptic modulator shifts the frequency of the beam for the reference channel. Next, the backscattered signal is mixed with the shifted reference in order to generate interference in a detector.

In the anemometer application, a laser beam, generated by a laser source, is focused at a certain distance from the aircraft. Aerosols present in the atmosphere backscatter the incident beam, producing a shift in its emission frequency. The Doppler frequency, that is to say the difference between the frequency of the backscattering beam and the incident beam is detected by an interferometer in order to deduce the speed of the aircraft. It is known that the value of the Doppler frequency Fd is given by:

$$Fd = 2v/\lambda,$$

v being the projection, onto the line of sight of the laser, of the aircraft speed relative to the ambient medium (the atmosphere), i.e. the reference with respect to which it is desired to measure the speed of movement of the aircraft, and $\lambda$ being the wavelength of the emitted beam.

FIG. 1 shows a block diagram of an optical Doppler measurement device of the prior art, which uses a frequency shift device of the AOM type.

The device shown in FIG. 1 comprises in particular a laser unit 10, a mixing/detection unit 12 and an optical head 14, these components 10, 12, 14 corresponding to the main functions of the measurement device.

The laser unit 10 comprises a laser source SL and a polarization-maintaining coupler (PMC) 18 delivering a first optical signal for injection into a signal channel 20 and a second optical signal for injection into a reference channel 22.

The signal channel into which the first optical signal is injected comprises a fiber acoustooptic modulator (AOM) 24 shifting the frequency of the optical signal. The signal output by the AOM is preamplified and then amplified, by an optical preamplifier (Pamp) 26 and an optical amplifier (Amp) 28, respectively, which deliver an optical power signal to be emitted into the reference medium.

The power signal output by the signal channel 20 is injected, through a polarization-splitting coupler (PSC) 32 and an optical bidirectional link 34 of the mixing/detection unit 12, the optical head 14 radiating a laser beam Fem into the reference medium.

The optical head firstly focuses the emitted laser beam Fem in the reference medium and, secondly, detects the rays Frd backscattered by the medium in a specified direction.

The backscattered rays Frd detected by the optical head, which possibly include a Doppler shift, are sent via the bidirectional optical link 34 to the polarization-splitting coupler 32, which delivers, owing to the rotation of the polarization of the backscattered signal relative to the emitted signal, by means of a $\lambda/4$ optical plate 35, a backscattered optical signal Pr to a signal return output Sr.

The mixing/detection unit 12 further includes a polarization-maintaining coupler (PMC) 40 which receives, at one of its inputs, the reference signal POL output by the reference channel of the laser unit 10 and receiving, at another input, the backscattered signal Pr. The PMC coupler 40 mixes the two frequency-shifted optical signals injected into its two inputs, generating interference signals injected into a detector Dt 42.

Signal processing applied to the detector then allows extraction of the Doppler shift, measurement of the speed of movement v and the direction of movement.

Detection of the Doppler shift in this structure shown in FIG. 1 is coherent, of the heterodyne type (frequency shift by the AOM).

In this type of structure for measuring a Doppler shift, the use of an acoustooptic modulator AOM to shift the frequency of the reference channel beam has the drawback of generating harmonics liable to disturb the signal processing and, consequently, parasitic signals that limit the spectral measurement window and precision.

SUMMARY OF THE INVENTION

To be able to alleviate the drawbacks of the measurement structures of the prior art, the invention proposes a device for measuring a Doppler frequency shift, comprising:

an optical signal channel delivering a signal light beam illuminating a reference medium;

a reference channel delivering a reference light beam for detecting the Doppler frequency shift, the frequency shift being determined from the difference in frequency between the light signal illuminating the reference medium and the light beam returned by the reference medium, characterized in that it includes at least two wavelength-shifted light radiation sources, preferably lasers, one light radiating source generating the light beam for the signal channel and the other source generating the light beam for the reference channel.

A first objective of this invention is to improve the optical Doppler measurement precision by eliminating the active frequency shift device used in the structures of the prior art.

Other objectives are to simplify the manufacture of the measurement device and to lower its cost.

In a preferred embodiment of the device according to the invention, the two laser sources wavelength-offset by Δλ are produced on one and the same integration substrate or wafer. It is also another objective of this invention to profit from the technology of microlasers on a wafer (glass substrate, silicon, InP, etc.), since the integrated microlasers on common wafers are very stable in terms of temperature and vibration. Likewise, they have the property of behaving in the same manner (common pumping and support). Their very high coherence (with a typical width of 8 kHz) offers the possibility of making them beat together. The two (or more) lasers will be chosen to generate the light beams in the channels of the measurement device according to the invention by the closeness of their wavelengths, the frequency difference of these types of laser possibly being between 100 MHz and 10 GHz.

In a first structure comprising two laser sources, the measurement device according to the invention includes an optical coupler having two optical coupling inputs and at least one optical output connected to an optical detector, the optical detectors delivering, from the light beam returned by the reference medium and the light beam for the reference channel that are applied to the respective inputs of the optical coupler, a beat signal Bs corresponding to the frequency difference between the two light beams applied to the inputs of the optical coupler possibly including the Doppler shift.

FIG. 2 shows a measurement device according to the invention comprising two laser sources, namely a first laser source SL1 for generating the optical signal of the signal channel 20 and the other laser source for generating the optical signal of the reference channel 22, it being possible for the Doppler shift to be detected either in the same way as in the embodiment shown in FIG. 1, by balanced detection, or in another way, as shown in FIG. 2, by simple detection.

In another preferred structure, the measurement device according to the invention includes, in addition to the optical coupler and the optical detector, another optical coupler having a first A and a second B optical coupling input, an optical output of this other optical coupler being connected to an input of another optical detector, the other optical coupler receiving, at one of the coupling inputs A, the optical signal generated by the second laser source SL2 of the reference channel and, at the other input B, the optical signal generated by the first laser source SL1 of the signal channel, the other optical detector delivering a beat frequency signal Br between the two light beams generated by the two laser sources.

In this other structure, the two detectors deliver beat signals of the same frequency, one of the beat signals possibly including the Doppler shift. The frequency difference between the two sources owing to the frequency dispersion of the lasers is thus eliminated and detection of the Doppler shift can thus be carried out more easily, either by mixing the signals output by the detectors (incoherent detection) or by mixing a signal output by one of the detectors with the signal output by the other detector, this signal being frequency-shifted by means of another mixer.

BRIEF DESCRIPTION OF THE DRAWINGS

The invention will be more clearly understood from the description of various structures of Doppler shift measurement devices according to the invention, with reference to the appended drawings in which:

FIG. 2, already described, shows a measurement device according to the invention, comprising two laser sources;

FIG. 3 shows a block diagram of the principle of the measurement device according to the invention;

DETAILED DESCRIPTION OF THE DRAWINGS

Figure 1:
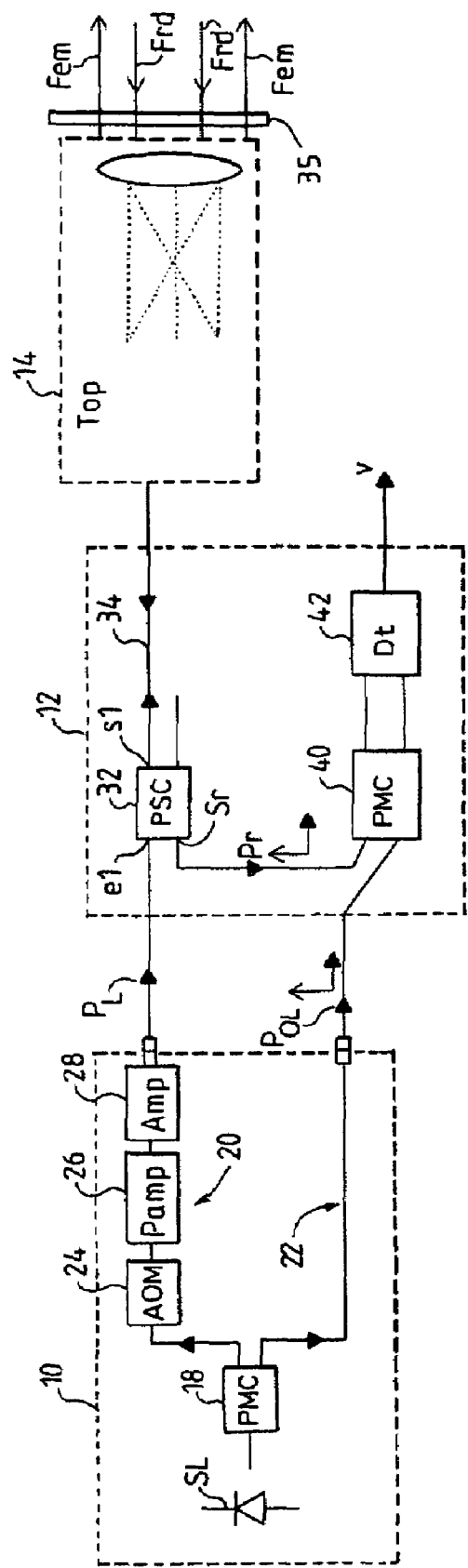
FIG. 1, already described, shows a block diagram of a device according to the prior art for measuring a Doppler shift of the optical type.

FIG. 3 shows a block diagram of the principle of the measurement device according to the invention comprising two laser sources.

The device of FIG. 3 essentially comprises:

a signal channel 60 comprising an optical polarization-splitting coupler PSC 62 having two inputs, the coupler PSC receiving, at a first input e1, through an optical amplifier Amp 64, an optical signal generated by a first laser source SL1, the optical coupler 62 delivering, to an output s1, an amplified optical signal intended to be radiated through an optical head 68 in a reference medium;

a reference channel 80 comprising an optical polarization-maintaining coupler PMC 82 having a first A and a second B optical coupling input and an optical output Sp1 connected to an input Ed1 of an optical detector Dt 84 followed by an amplifier 86, the polarization-maintaining coupler 82 receiving, at one of the coupling inputs B, an optical signal generated by a second laser source SL2 and, at the other input A, through the polarization-splitting coupler PSC 62 of the signal channel 60, the backscattered optical signal Frd, backscattered by the medium, possibly including the Doppler shift, the optical detector 84 delivering a beat signal Bs corresponding to the difference between the frequencies of the two light beams applied to the inputs A, B of the optical coupler 82, possibly including the Doppler shift; and another optical polarization-maintaining coupler PMC 90 having a first A and a second B optical coupling input and an optical output Sp2 connected to an input Ed2 of another optical detector 92 followed by an amplifier 94, the other polarization-maintaining coupler 90 receiving, at one of the coupling inputs A, the optical signal generated by the second laser source SL2 of the reference channel and, at the other input B, the optical signal generated by the first laser source SL1 of the signal channel, the other optical detector 92 delivering a beat frequency signal Br between the two light beams generated by the two laser sources SL1, SL2.

In the structural principle of the device according to the invention of FIG. 3, the beat signals Br, Bs output by the respective detectors 84, 92 and passing through the respective amplifiers 86, 94 are injected into respective inputs m1 and m2 of a mixer 100, which delivers, at an output s2, an analog signal carrying the Doppler shift filtered by a band filter 102 before being digitized by an analog/digital coder ADC 104 for extracting the Doppler shift information. The beat frequencies Br and Bs output by the detectors Dt 84, 92 are identical except for the possible Doppler shift.

Figure 4:
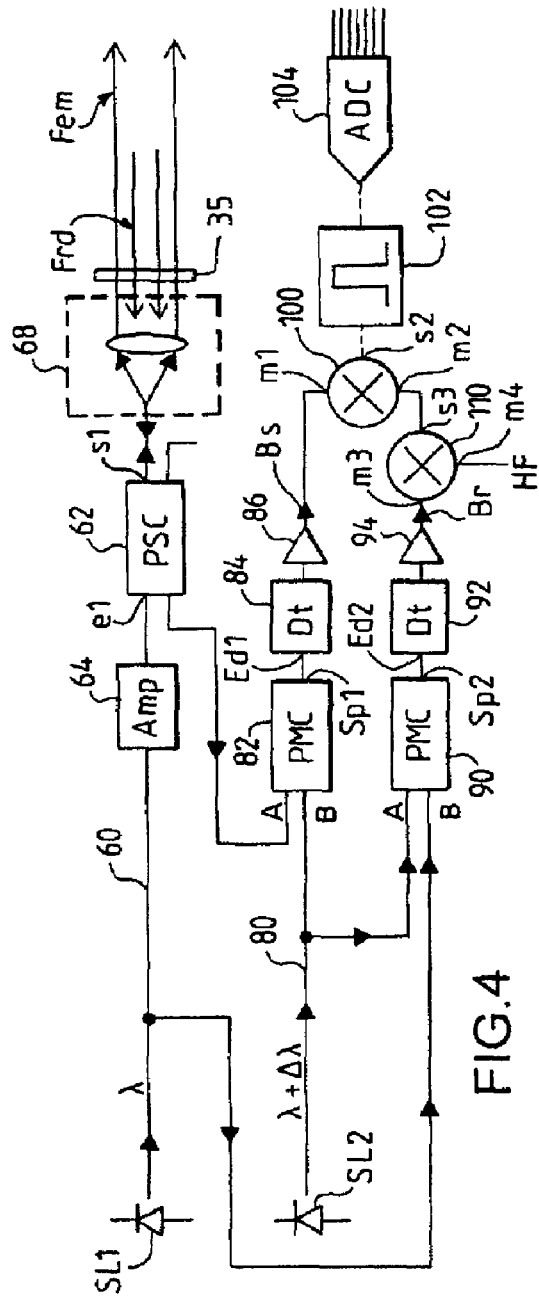
FIG. 4 shows a first embodiment of the device according to the invention based on the device of FIG. 3.

FIG. 4 shows a first embodiment of the device according to the invention based on the device of FIG. 3. In this first embodiment, the frequency output by the other detector 92 and passing through the amplifier 94 is shifted by a frequency difference HF. For this purpose, the device of FIG. 4 includes another frequency mixer 110 into which are injected, at a mixing input m3, the beat signal Br output by the other detector 92 and passing through the amplifier 94, and, at another mixing input m4, a shift frequency HF, the mixer 110 delivering, via a mixing output s3, a signal that is injected into one of the inputs m2 of the mixer 100, the beat signal Bs output by the detector 84 and passing through the amplifier 86 being injected into the other input m1 of the mixer 100, the mixer 100 delivering, at the outlet s2, a frequency-shifted analog signal HF carrying the Doppler shift which is filtered by the band filter 102 before being digitized by the analog/digital coder ADC 104 for extracting the Doppler shift information.

This first preferred embodiment of the measurement device gives the sign of the velocity (negative frequencies), for example of the aerosols producing the Doppler effect.

Figure 5:
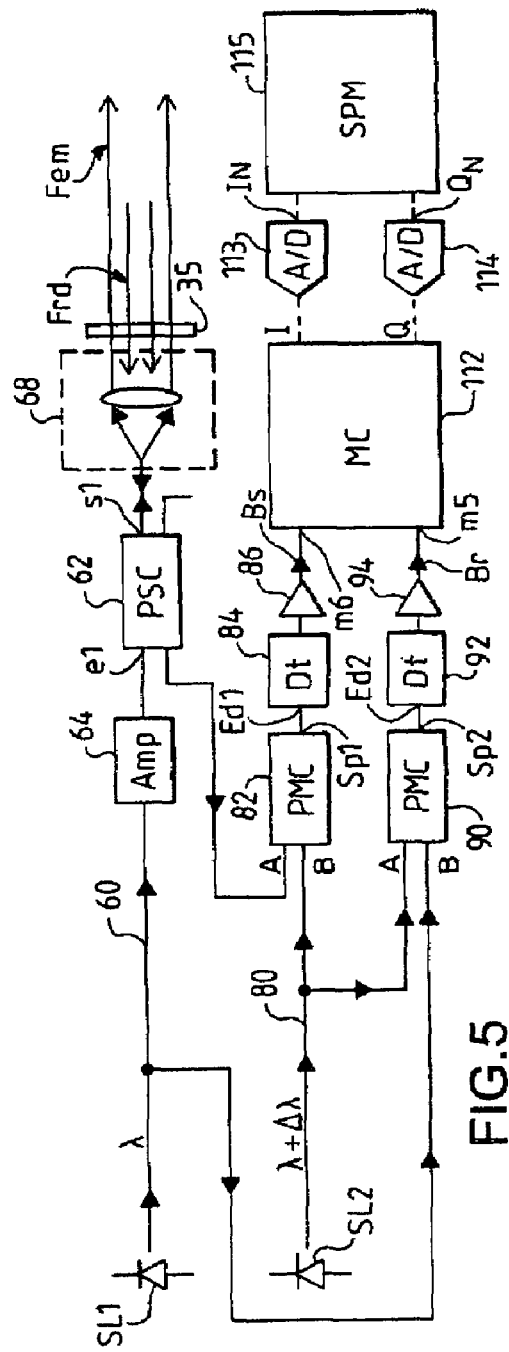
FIG. 5 shows a second embodiment of the device according to the invention based on the device of FIG. 3.

FIG. 5 shows a second embodiment of the device according to the invention based on the device of FIG. 3. In this second embodiment, the device includes a complex frequency mixer MC 112 into which are injected, at a mixing input m5, the beat signal Br output by the other detector 92 and passing through the amplifier 94 and, at another mixing input m6, the beat signal Bs output by the detector 84 and passing through the amplifier 86, the complex mixer MC 112 delivering, via two outputs I and Q, complex signals digitally coded by a respective analog/digital coder ADC 113, 114, digital signals $I_N$ and $Q_N$ output by the respective coders ADC 113, 114 being injected into a baseband signal processing module SPM 115 that delivers the Doppler shift.

By controlling the frequency of one of the two laser sources, in this case SL2, it is possible to obtain a shift between the frequencies of the two substantially constant lasers. One advantage of laser frequency control is that it delivers beat frequency signals Br and Bs output by the detectors that are substantially identical during fabrication (dispersion), but also over time. This allows the detectors and the mixers to be operated within their optimum operating ranges.

In other embodiments, several laser sources are fabricated on one and the same wafer in order to be able to choose, from these sources, those that deliver frequencies giving beats close to those desired.

One of the main advantages of this invention is the elimination of the acoustooptic modulator AOM of the optical Doppler shift measurement devices. This is because the AOM, apart from its high cost, has a high electrical consumption, which represents a major drawback in the case of use in aircraft. Furthermore, as was already mentioned above, the AOM generates harmonics that impair the precision of the Doppler measurement.

The invention claimed is:

1. A device for measuring a Doppler frequency shift, comprising:

an optical signal channel delivering an optical signal light beam illuminating a reference medium, a portion of the optical signal light beam illuminating the reference medium being returned by the reference medium;

a reference channel delivering a reference light beam for detecting the Doppler frequency shift, the frequency shift being determined from the difference in frequency between the light signal illuminating the reference medium and the portion of the optical signal light beam returned by the reference medium;

at least two wavelength-shifted light radiation sources, a first light radiating source generating the optical signal light beam for the optical signal channel and a second light radiating source generating a reference signal light beam for the reference channel, wherein the optical signal channel comprising an optical polarization-splitting coupler having two inputs, a first input and a second input, the optical polarization-splitting coupler receiving at the first input through an optical amplifier, the optical signal light beam generated by the first light radiation source of the optical signal channel, the optical polarization-splitting coupler configured to deliver an amplified optical signal light beam to an output and radiate the amplified optical signal light beam through an optical head in the reference medium, and wherein the reference signal channel comprising a first optical polarization-maintaining coupler having a first and a second optical coupling input, and an optical output connected to an input of a first optical detector followed by a first amplifier, the first optical polarization-maintaining coupler configured to receive, at the second coupling input, an optical signal generated by the second radiation source and, at the first optical coupling input, through the second input of the optical polarization-splitting coupler, the portion of the signal light beam returned by the reference medium including the Doppler shift, the first optical detector delivering a first beat signal Bs corresponding to the difference between the frequencies of the two light beams applied to the inputs of the optical polarization-maintaining coupler including the Doppler shift;

a second optical polarization-maintaining coupler having another first and another second optical coupling input and an optical output connected to an input of a second optical detector followed by a second amplifier, the second polarization-maintaining coupler receiving, at the other first optical coupling input, the optical signal generated by the second light radiation source and, at the other second optical coupling input, the optical signal generated by the first light radiation source, the second optical detector delivering a second beat signal Br between the two light beams generated by the two light radiations sources; and a mixer into which are injected, via respective inputs, the amplified first and second beat signals, Bs and Br, the mixer configured to deliver an analog signal carrying the Doppler shift at an output of the mixer.

2. The measurement device as claimed in claim 1, wherein the analog signal carrying the Doppler shift is filtered by a band filter before being digitized by an analog/digital coder for extracting the Doppler shift information.

3. The measurement device as claimed in claim 1, wherein the two light radiating sources, wavelength-shifted by $\Delta\lambda$, are produced on one and the same integration substrate or wafer.

4. The measurement device as claimed in claim 1 wherein several laser sources are fabricated on one and the same wafer in order to be able to choose, from these sources, wavelength-shifted light radiating sources that deliver frequencies giving beats close to those desired.

5. The measurement device as claimed in claim 1, wherein the wavelength-shifted light radiation sources are lasers.

6. The measurement device as claimed in claim 2 wherein the two light radiating sources, wavelength-shifted by $\Delta\lambda$, are produced on one and the same integration substrate or wafer.

7. The measurement device as claimed in claim 1 wherein the light radiating sources, wavelength-shifted by $\Delta\lambda$, are produced on one and the same integration substrate or wafer.

8. A device for measuring a Doppler frequency shift, comprising:
- an optical signal channel configured to deliver a optical signal light beam, the optical signal light beam configured to illuminate a reference medium, a portion of the signal light beam illuminating the reference medium returned by the reference medium;
- a reference channel configured to deliver a reference signal light beam, the reference signal light beam configured to detect a Doppler frequency shift, the frequency shift being determined from a difference in frequency between the signal light beam illuminating the reference medium and the portion of the signal light beam returned by the reference medium;
- at least two wavelength-shifted light radiation sources, a first light radiation source configured to generate the optical signal light beam of the optical signal channel and a second light radiation source configured to generate the reference signal light beam of the reference channel,
  - wherein the optical signal channel comprises an optical polarization-splitting coupler having two inputs, a first input el and a second input, the optical polarization-splitting coupler receiving, at the first input e1, through an optical amplifier, the optical signal light beam generated by the first light radiation source of the optical signal channel, the optical polarization-splitting coupler delivering, to an output, an amplified optical signal light intended to be radiated through an optical head in the reference medium, and
  - wherein the reference channel comprises an optical polarization-maintaining coupler having a first input A and a second input B and an optical output connected to an input of an optical detector followed by an amplifier, the polarization-maintaining coupler receiving, at the second coupling input, an optical signal generated by the second light radiation source and, at the first optical coupling input, through the second input of the optical polarization-splitting coupler, the portion of the signal light beam returned by the reference medium including the Doppler shift, the optical detector delivering a beat signal Bs corresponding to a difference between the frequencies of the two light beams applied to the inputs of the optical polarization-maintaining coupler including the Doppler shift;
- another optical polarization-maintaining coupler having a first A and a second B optical coupling input, and an optical output connected to an input of another optical detector followed by another amplifier, the other polarization-maintaining coupler receiving, at the first A optical coupling input, the optical signal generated by the second light radiation source of the reference channel and, at the second B optical coupling input, the optical signal generated by the first light radiation source of the optical signal channel, the other optical detector delivering another beat signal Br between the two light beams generated by the two light radiations sources;
- a first mixer having two inputs, and an output s2, the beat signal Bs at the output of the optical detector followed by the amplifier being injected at one input of the first mixer; and
- a second mixer having two mixing inputs and a mixing output s3, the other beat signal Br at the output of the other optical detector and passing through the other amplifier being injected at one mixing input of the second mixer, a shift frequency HF being injected at the other mixing input of the second mixer delivering at the mixing output s3 a signal that is injected into the second input of the first mixer, the first mixer delivering, at the output s2, a frequency-shifted analog signal HF carrying the Doppler shift.

9. The measurement device as claimed in claim 8, wherein the analog signal carrying the Doppler shift is filtered by a band filter before being digitized by an analog/digital coder for extracting the Doppler shift information.

10. The measurement device as claimed in claim 8, wherein the two light radiation sources wavelength-shifted by $\Delta\lambda$ are produced on one and the same integration substrate or wafer.

11. The measurement device as claimed in claim 8, wherein several laser sources are fabricated on one and the same wafer in order to be able to choose, from these light radiation sources, those that deliver frequencies giving beats close to those desired.

12. The measurement device as claimed in claim 8, wherein the wavelength-shifted light radiation sources are lasers.

13. A device for measuring a Doppler frequency shift, comprising:
- an optical signal channel delivering an optical signal light beam illuminating a reference medium, a portion of the signal light beam illuminating the reference medium returned by the reference medium;
- a reference signal channel delivering a reference light beam for detecting the Doppler frequency shift, the frequency shift being determined from the difference in frequency between the light signal illuminating the reference medium and the portion of the signal light beam returned by the reference medium, at least two wavelength-shifted light radiation sources, a first light radiating source generating the light beam for the optical signal channel and a second light radiating source generating a reference signal light beam for the reference channel;
- the optical signal channel comprising an optical polarization-splitting coupler (PSC) having two inputs, a first input e1 and a second input, the optical polarization splitting coupler receiving, at the first input e1, through an optical amplifier Amp, the optical signal light beam generated by the first light radiation sources of the optical signal channel, the optical polarization-splitting coupler delivering, to an output s1, an amplified optical signal light intended to be radiated through an optical head in the reference medium,
- wherein the reference channel comprises an optical polarization-maintaining coupler having a first A and a second B optical coupling input and an optical output connected to an input of an optical detector followed by an amplifier, the polarization maintaining coupler receiving, at the second coupling inputs, an optical signal generated by the second light radiation sources of the reference channel and, at the first optical coupling input, through the second input of the optical polarization-splitting coupler of the signal channel, the portion of the signal light beam returned by the reference medium including the Doppler shift, the optical detector delivering a beat signal Bs corresponding to the difference between the frequencies of the two light beams applied to the inputs of the optical polarization-maintaining coupler including the Doppler shift;
- another optical polarization-maintaining coupler having a first A and a second B optical coupling input and an optical output connected to an input of another optical detector followed by another amplifier, the other polarization-maintaining coupler receiving, at the first A optical coupling input, the optical signal generated by the second light radiation source of the reference channel and, at the second B optical coupling input, the optical signal generated by the first light radiation source of the optical signal channel, the other optical detector delivering another beat signal Br between the two light beams generated by the two light radiations sources; and a complex frequency mixer into which are injected, at a mixing input, the beat signal Br output by the other detector and passing through the other amplifier and, at another mixing input, the beat signal Bs output by the detector and passing through the amplifier, the complex mixer delivering, via two outputs I and Q, complex signals digitally coded, by a respective analog/digital coder, digital signals IN and QN output by the respective analog/digital coders being injected into a baseband signal processing module that delivers the Doppler shift.

14. The measurement device as claimed in claim 13, wherein the two light radiation sources wavelength-shifted by $\Delta\lambda$ are produced on one and the same integration substrate or wafer.

15. The measurement device as claimed in claim 13, wherein several laser sources are fabricated on one and the same wafer in order to be able to choose, from these light radiation sources, those that deliver frequencies giving beats close to those desired.

16. Device as claimed in claim 13, wherein the wavelength-shifted light radiation sources are lasers.

* * * * *